W. H. STEVENS.
LAMP ADJUSTING MECHANISM FOR VEHICLES.
APPLICATION FILED SEPT. 5, 1912.
1,052,858.
Patented Feb. 11, 1913.
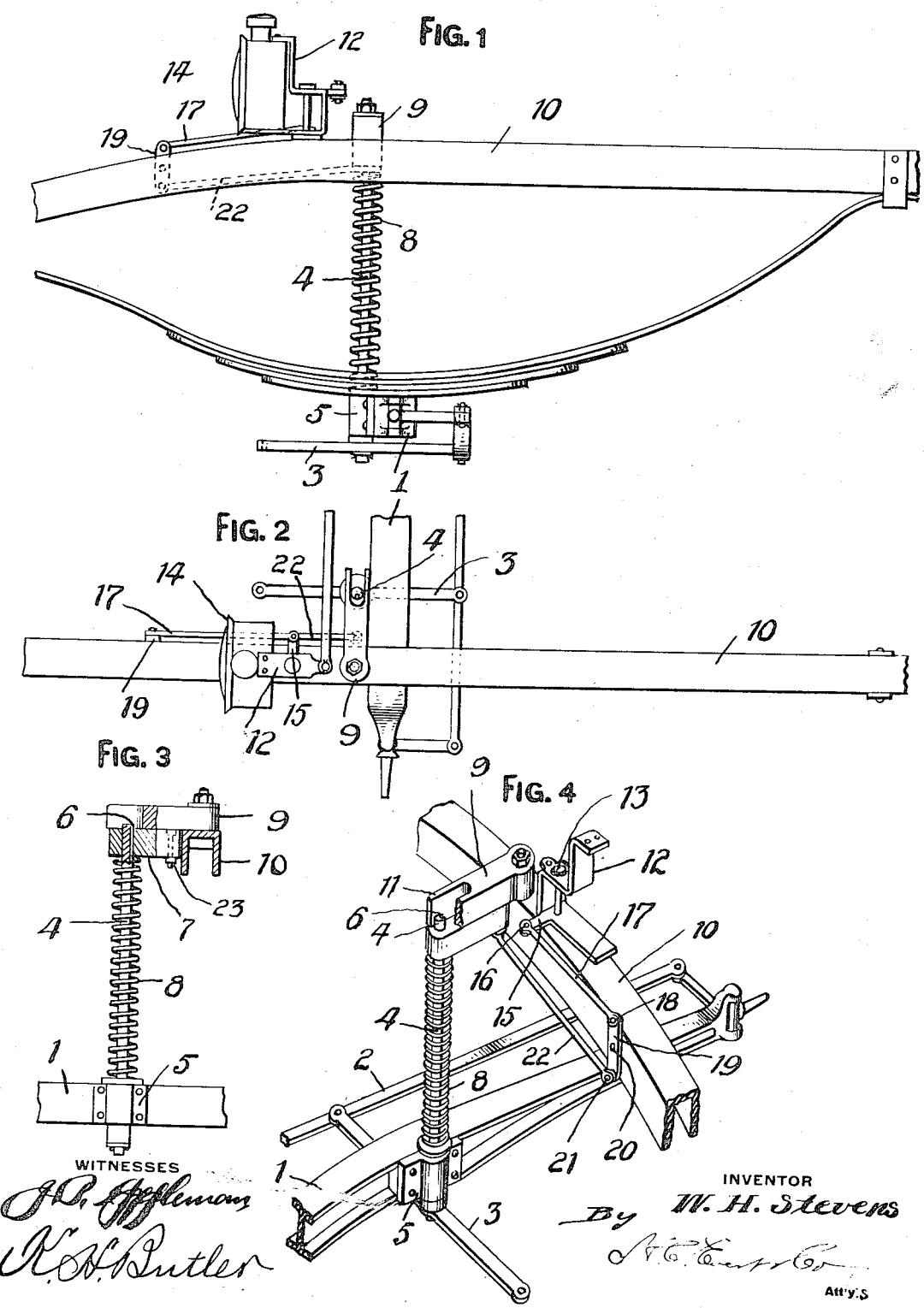

UNITED STATES PATENT OFFICE.

WILLIAM H. STEVENS, OF PITTSBURGH, PENNSYLVANIA.

LAMP-ADJUSTING MECHANISM FOR VEHICLES.

1,052,858.

Specification of Letters Patent. Patented Feb. 11, 1913.

Application filed September 5, 1912. Serial No. 718,749.

*To all whom it may concern:*

Be it known that I, WILLIAM H. STEVENS, a citizen of the United States of America, residing at Pittsburgh, in the county of Allegheny and State of Pennsylvania, have invented certain new and useful Improvements in Lamp-Adjusting Mechanism for Vehicles, of which the following is a specification, reference being had therein to the accompanying drawing.

This invention relates to a lamp adjusting mechanism for vehicles, and the objects of my invention are to furnish a vehicle, as an automobile, with positive and reliable means, as hereinafter set forth, for casting rays of light in the direction in which an automobile is traveling, and to provide a mechanism of the above character that is applicable to various types of automobiles.

I attain the above objects by a lamp adjusting or shifting mechanism that is simple, durable, and highly efficient for the purposes for which it is intended.

The mechanism is constructed to compensate for the jars and vibrations between the running gear and the main frame work or body of an automobile, and with the mechanism automatically actuated the chauffeur or driver of a machine can always observe the path to be traversed by the machine, especially on curved sections of road.

The invention will be hereinafter specifically described and then claimed, and reference will now be had to the drawing, wherein:—

Figure 1 is a side elevation of the lamp adjusting mechanism, Fig. 2 is a plan of the same, Fig. 3 is a cross sectional view of a portion of the mechanism, and Fig. 4 is a perspective view of the mechanism.

Further describing my invention in detail with reference to the drawing wherein like numerals denote corresponding parts throughout: 1 denotes an axle provided with a conventional form of steering mechanism 2, which includes a transverse arm 3 mounted upon the lower end of a vertical shaft 4 journaled in a bearing 5, carried by one of the sides of the axle 1. The vertical shaft 4 has the upper end thereof provided with a longitudinal groove 6 and slidably mounted upon the upper end of said shaft is a crank 7 that has a tongue extending into the groove 6 whereby said crank will rotate in unison with said shaft.

8 denotes a coiled compression spring encircling the vertical shaft 4 between the bearing 5 and the crank 7, said compression spring holding the crank 7 normally in engagement with a stop 9 mounted upon a side frame 10 of an automobile. The stop 9 is bifurcated or slotted, as at 11 to provide clearance for the upper end of the shaft 4.

12 denotes a lamp holder pivotally supported upon the frame 10 by a pin 13 and this holder supports a conventional form of lamp or lantern 14. The holder 12 has a side extension 15 pivotally connected, as at 16 to a connecting rod 17. The rod 17 is pivotally connected, as at 18 to a lever 19 pivotally mounted upon a side of the frame 10; as at 20. The lever 19 is pivotally connected, as at 21 to a rod 22 that is pivotally connected, as at 23 to the underneath side of the crank 7.

When the ordinary steering mechanism 2 is moved, the lamp adjusting or shifting mechanism is actuated to swing the lamp or lantern 14 in the same direction as the forward wheels of the automobile. The coiled compression spring 8 holds the crank 7 normally in engagement with the stop 9, but allows the shaft 4 and the axle 1 to move relatively to the frame 10, without interfering with the operation of the lamp shifting mechanism.

While in the drawing there is illustrated a preferred embodiment of the invention, it is to be understood that the structural elements are susceptible to such changes as fall within the scope of the appended claim.

What I claim is:—

In a lamp adjusting mechanism for automobiles, the combination with an axle having a steering mechanism, a side frame, and a lamp holder pivotally mounted upon said side frame, of a vertical rotatable shaft supported by said axle and rotated by the steering mechanism thereof, a crank slidably mounted upon the upper end of said shaft and capable of rotating therewith, a bifurcated stop carried by said frame, a coiled compression spring encircling said shaft and retaining said crank normally in engagement with said stop, a lever pivotally supported by said frame, a rod having the ends thereof pivotally connected to said lever and to said lamp holder, and a rod having the ends thereof pivotally connected to said crank and to said lever whereby said lamp holder can be actuated simultaneous with the steering mechanism of said axle.

In testimony whereof I affix my signature in the presence of two witnesses.

WILLIAM H. STEVENS.

Witnesses:
MAX H. SROLOVITZ,
KATHERINE ERRETT.